United States Patent [19]

Denslow

[11] 4,155,499

[45] May 22, 1979

[54] METHOD OF WELDING METALLIC CONDUCTORS USING VIBRATORY ENERGY

[75] Inventor: Clark A. Denslow, Wilton, Conn.

[73] Assignee: Branson Ultrasonics Corporation, New Canaan, Conn.

[21] Appl. No.: 895,807

[22] Filed: Apr. 12, 1978

[51] Int. Cl.² ............................................. B23K 21/02
[52] U.S. Cl. ................................... 228/111; 29/628; 228/170
[58] Field of Search ............... 228/1 R, 110, 111, 170, 228/173 A; 29/628

[56] References Cited

U.S. PATENT DOCUMENTS

| | | | |
|---|---|---|---|
| 3,531,852 | 10/1970 | Slemmons et al. | 228/110 |
| 3,752,380 | 8/1973 | Shoh | 228/1 R |
| 3,791,569 | 2/1974 | Mims | 228/1 R |
| 3,848,792 | 11/1974 | Mims | 228/1 R |

Primary Examiner—Charlie T. Moon
Assistant Examiner—Kenneth J. Ramsey
Attorney, Agent, or Firm—Ervin B. Steinberg; Philip J. Feig

[57] ABSTRACT

Metallic workpieces, such as the terminals of a direct current motor armature winding, are welded to a slot, such as a commutator slot, using high frequency vibratory energy. A half wavelength resonator including a tip having a cutting surface is disposed opposite a slot containing the workpieces. As an applied force urges the tip into relative motion with respect to the slot, the cutting surface cleaves a sliver from the slot wall, the sliver being urged by the tip into intimate contact with the workpieces to be welded. When the resonator is rendered resonant for undergoing high frequency vibratory motion in a direction normal to the applied force the sliver and workpieces are welded together and to a surface of the slot.

12 Claims, 6 Drawing Figures

4,155,499

METHOD OF WELDING METALLIC CONDUCTORS USING VIBRATORY ENERGY

BACKGROUND OF THE INVENTION

This invention refers to a method of welding workpieces, such as metallic conductors or metal coated workpieces, to a slotted workpiece. Specifically, the invention concerns the welding of electrical coil wires of a direct current motor armature to respective commutator segments or slots using high frequency vibratory energy. Apparatus for performing such welding is described in U.S. Pat. No. 3,791,569, issued Feb 12, 1974 to Bruce L. Mims, entitled "Vibratory Welding Apparatus" and U.S. Pat. No. 3,848,792 issued Nov. 19, 1974 to Bruce L. Mims entitled "Vibratory Welding Apparatus," which patents are incorporated herein by reference.

SUMMARY OF THE INVENTION

High frequency vibratory welding comprises an apparatus for holding two metal workpieces to be joined in intimate contact under a static force and applying to one of the workpieces vibratory energy in a direction substantially perpendicular to the direction of the applied force. The result is a non-fusion metallurgical bond at the interface between the two workpieces. The vibratory energy supplied typically is in the sonic or ultrasonic frequency range, and most commonly in the range between one and 100 kHz.

In the Mims patents supra two electrical coil wires are superposed in a commutator segment or slot and a resonator dimensioned to be resonant at a predetermined frequency is urged into the slot and into intimate contact with one of the wires. The resonator is rendered resonant for undergoing high frequency vibratory motion in a direction normal to the static force urging the resonator into contact with the wires. Under the combined influence of the static force and vibratory energy the conductors become welded together and to the commutator slot.

Commutators, particularly rebuilt commutators may exhibit slots which differ in depth and width. These dimensional variations affect the strength of the weld between the conductors and the commutators. In order to overcome the problems inherent when such dimensional variations occur, the resonator in the present arrangement is provided with a tip having a cutting surface and an adjoining contoured portion for assuring welding between the slot and the conductors. Specifically, as the resonator is urged toward the slot, the cutting surface cleaves a sliver of the wall of the slot which sliver becomes trapped between the contoured portion of the advancing resonator and the conductors to be welded. When the resonator is rendered resonant, the sliver which is still joined to the slot is welded to the conductors to provide a positive connection between the commutator slot and the coil wires. The resonator tip cutting surface is dimensioned for the widest anticipated slot dimension and therefore will cleave a sliver from the wall of a slot having any anticipated dimension.

It has been found that by welding the conductors to the sliver an improved electrical and mechanical contact between the coil and the commutator results.

While the invention primarily concerns welding of armature coil wires to commutator segments, it will be apparent that the described method is equally applicable for welding metallic conductors of any configuration to slots in a workpiece. Moreover, the described vibratory welding process is suitable for joining copper to copper, copper to aluminum and aluminum to aluminum.

A principal object of this invention therefore is the provision of a method of welding conductors to a slot using high frequency vibratory energy.

Another object of the invention is the provision of a method of welding conductors to a commutator slot by cleaving a sliver of the slot wall and welding the sliver to the conductors using high frequency vibratory energy.

A further object of the invention is the provision of an improved method of welding electrical coil wires of a motor armature to a commutator segment.

Other and still further objects of the invention will become more clearly apparent when taking the following description in conjunction with the accompanying drawings.

DETAILED DESCRIPTION

Figure 1:
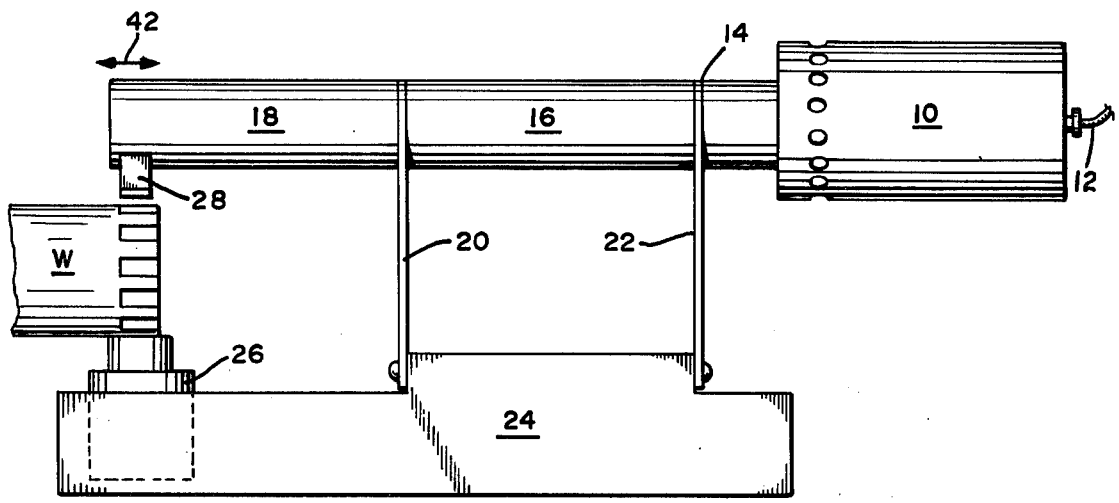
FIG. 1 is an elevational view of a typical apparatus for practicing the invention.

Referring now to the drawings and FIG. 1 in particular, there is shown a simplified apparatus for practising the invention. Numeral 10 identifies an electroacoustic converter unit which is adapted to receive high frequency electrical energy via conductor 12 and provide in response thereto high frequency vibratory energy at output surface 14. The converter unit 10 most suitably includes piezoelectric or magnetostrictive means for converting the applied electrical energy to mechanical energy. A converter unit suitable for such purpose is described, for instance, in U.S. Pat. No. 3,328,610 entitled "Sonic Wave Generator" issued to S. E. Jacke et al. on June 14, 1967. The frequency of the applied electrical energy, depending upon the particular requirements, may be in the range between one and 100 kilohertz, and most suitable in the range from approximately 10 kHz to 60 kHz.

An elongate coupling bar 16 and resonator 18 made of titanium, aluminum, Monel or the like are mechanically coupled to each other and to the output surface 14 and each is dimensioned to act as a half wavelength resonator at the applied frequency for the sound traveling longitudinally therethrough. A pair of upstanding support members 20 and 22 coupled to the resonator and elongate bar at antinodal regions support the assembly from base 24. An hydraulic anvil 26 is provided in base 24 for urging a workpiece disposed upon anvil 26 toward the resonator 18.

A welding tip 28 located substantially at an antinodal region of longitudinal motion of resonator 18 is disposed opposite anvil 26. The tip 28 may be screwed into the resonator 18 or alternatively may be a replaceable sleeve, either construction being well known in the art. The tip 28 may also comprise a balanced sleeve having a plurality of equidistant circumferentially spaced welding tips 28, see U.S. Pat. No. 3,813,006.

The construction of the welding apparatus shown here in a simplified manner is described in greater detail in U.S. Pat. No. 3,752,380 issued Aug. 14, 1973 to Andrew Shoh entitled "Vibratory Welding Apparatus." A substantially similar welding apparatus is employed in the Mims apparatus supra in combination with nesting and indexing means for welding at a plurality of circumferentially spaced locations.

Figure 2:
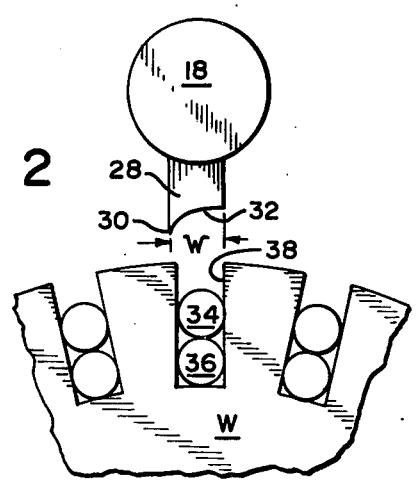
FIG. 2 is an enlarged view of the workpiece and apparatus prior to welding.

As best seen in FIG. 2, the frontal surface of welding tip 28 comprises a cutting surface 30 and an adjoining contoured portion 32.

Figure 3A:
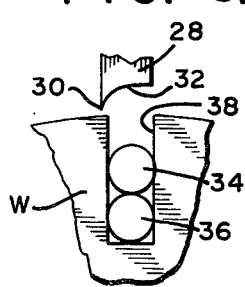
FIGS. 3A–3D are enlarged views of the workpieces and resonator during the welding cycle.
Figure 3B:
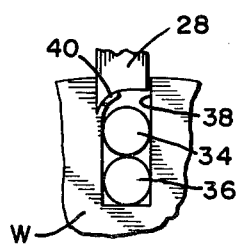
Figure 3C:
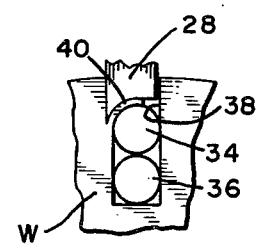
Figure 3D:
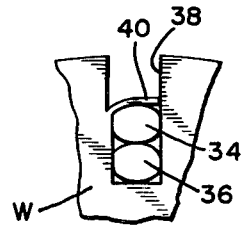

The method of welding is best described by referring to FIG. 3A, in which two metallic conductors 34 and 36, for instance, terminals from an electric armature winding, are to be welded to slot 38, for instance a commutator segment in a direct current motor. With the workpiece W containing slot 38 and the conductors 34 and 36 disposed therein in superposed relationship as shown, tip 28 undergoes relative motion toward to the workpiece thereby urging the tip 28 toward and into slot 38. As the tip 28 approaches the slot 38, cutting surface 30 penetrates the wall of slot 38 and cleaves a silver 40 therefrom. The sliver 40 follows the contour of adjoining section 32 of tip 28 as the tip 28 enters deeper into slot 38 (see FIG. 3B). In FIG. 3C the tip 28 is urged into intimate contact with the sliver 40 and conductors 34 and 36 at which time the resonator 18 is rendered resonant to undergo vibratory motion at the applied frequency in the direction of arrow 42, see FIG. 1, i.e., in a direction normal to the force urging tip 28 into contact with the conductors. The amplitude of vibratory motion is relatively small, typically 0.10 mm.

Under the combined influence of the force urging the conductors 34, 36, sliver 40 and tip 28 into contact and the high frequency vibratory energy, the sliver 40 and conductors 34 and 36 are welded together and to a surface of the slot 38 forming a bond between the conductors and the slot 38. The conductors may become welded to either a side wall surface or to the bottom surface of the slot or to both surfaces.

Subsequently the tip 28 is lifted from slot 38 leaving the weld parts and one slightly narrowed wall of slot 38. The width w of tip 28 is dimensioned to be sufficiently wide to cleave a wall of a slot of any anticipated dimension.

Of course, the resonator may be rendered resonant while tip 28 undergoes relative motion toward slot 28 and conductors 34 and 36 for facilitating cleaving of the slot wall.

If the workpiece is an automobile starter motor commutator, the commutator after one weld would be rotated using for instance the Mims apparatus placing the next slot and pair of conductors under tip 28 at which time the above described welding cycle is repeated. After all the windings of the armature are welded, the commutator is removed from the welding apparatus and the next armature is placed in position to repeat the cycle.

It has been determined that in the case of rebuilt or reconditioned armatures welds formed according to the present invention provide better reliability than the welds formed without cleaving a sliver of the slot wall into contact with the conductors to be welded as was the method used heretofore.

It will be apparent alternatively that a single metallic workpiece can be advantageously welded to a slot according to the method described herein.

While the above description refers to welding armature wires to a commutator, it will be apparent to those skilled in the art the method is equally advantageous for welding any metallic workpiece to a slotted workpiece.

I claim:

1. A method of welding a metallic conductor to a slot disposed in a workpiece comprising:

disposing the conductor in the slot of the workpiece;

providing a mechanical resonator dimensioned to be resonant along its longitudinal axis at a predetermined high frequency, and said resonator having a workpiece engaging tip disposed substantially at an antinodal region of longitudinal motion of said resonator;

providing forced engagement between said tip and workpiece for causing said tip to cleave a sliver from a wall forming said slot and forcing said sliver over said conductor and causing intimate forced contact between said sliver, conductor and bottom surface of the slot, and effecting a non-fusion bond between said sliver, conductor and a surface of the slot responsive to high frequency vibratory energy provided by said resonator being rendered resonant and acting upon said tip which is in said forced engagement, the axis of said vibratory energy being normal to the force causing said forced engagement.

2. A method as set forth in claim 1, said resonator being rendered resonant after said tip is in forced contact with said sliver, conductor and bottom surface of the slot.

3. A method as set forth in claim 1, said resonator being rendered resonant while said tip cleaves a sliver from the wall forming said slot.

4. A method as set forth in claims 2, or 3, said predetermined high frequency being in the range between one kHz and 100 kHz.

5. A method as set forth in claim 1, said workpiece engaging tip having a cutting surface and an adjoining contoured surface.

6. A method of welding metallic conductors to a slot in a workpiece comprising the steps of:

disposing a pair of conductors in superposed relation in the slot of the workpiece, to cause an upper and a lower conductor, the bottom surface of the lower conductor contacting the bottom surface of the slot;

providing a mechanical resonator dimensioned to be resonant along its longitudinal axis at a predetermined high frequency, and said resonator having a workpiece engaging tip disposed substantially at an antinodal region of longitudinal motion of said resonator;

providing forced engagement between said tip and workpiece for causing said tip to cleave a sliver from a wall forming said slot and forcing said sliver over the top surface of the upper conductor and causing intimate forced contact between said sliver, conductors and bottom surface of the slot, and effecting a non-fusion bond between said sliver and top surface of said upper conductor, between the bottom surface of said upper conductor and the top surface of the bottom conductor, and between said bottom conductor and a surface of the slot responsive to high frequency vibratory energy provided by said resonator being rendered resonant and acting upon said tip which is in said forced engagement, the axis of said vibratory energy being normal to the force causing said forced engagement.

7. A method as set forth in claim 6, said resonator being rendered resonant after said tip is in forced contact with said sliver, conductors and bottom surface of the slot.

8. A method as set forth in claim 6, said resonator being rendered resonant while said tip cleaves a sliver from a wall forming said slot.

9. A method as set forth in claims 7, or 8, said predetermined high frequency being in the range between one kHz and 100 kHz.

10. A method as set forth in claim 6, said workpiece engaging tip having a cutting surface and an adjoining contoured surface.

11. A method as set for in claim 6, said conductors disposed in superposed relation being disposed in parallel along their respective axis.

12. A method as set forth in claim 6, said conductors being terminals of an electric winding coil and said slot being a commutator slot in a motor.

* * * * *